Patented Aug. 4, 1925.

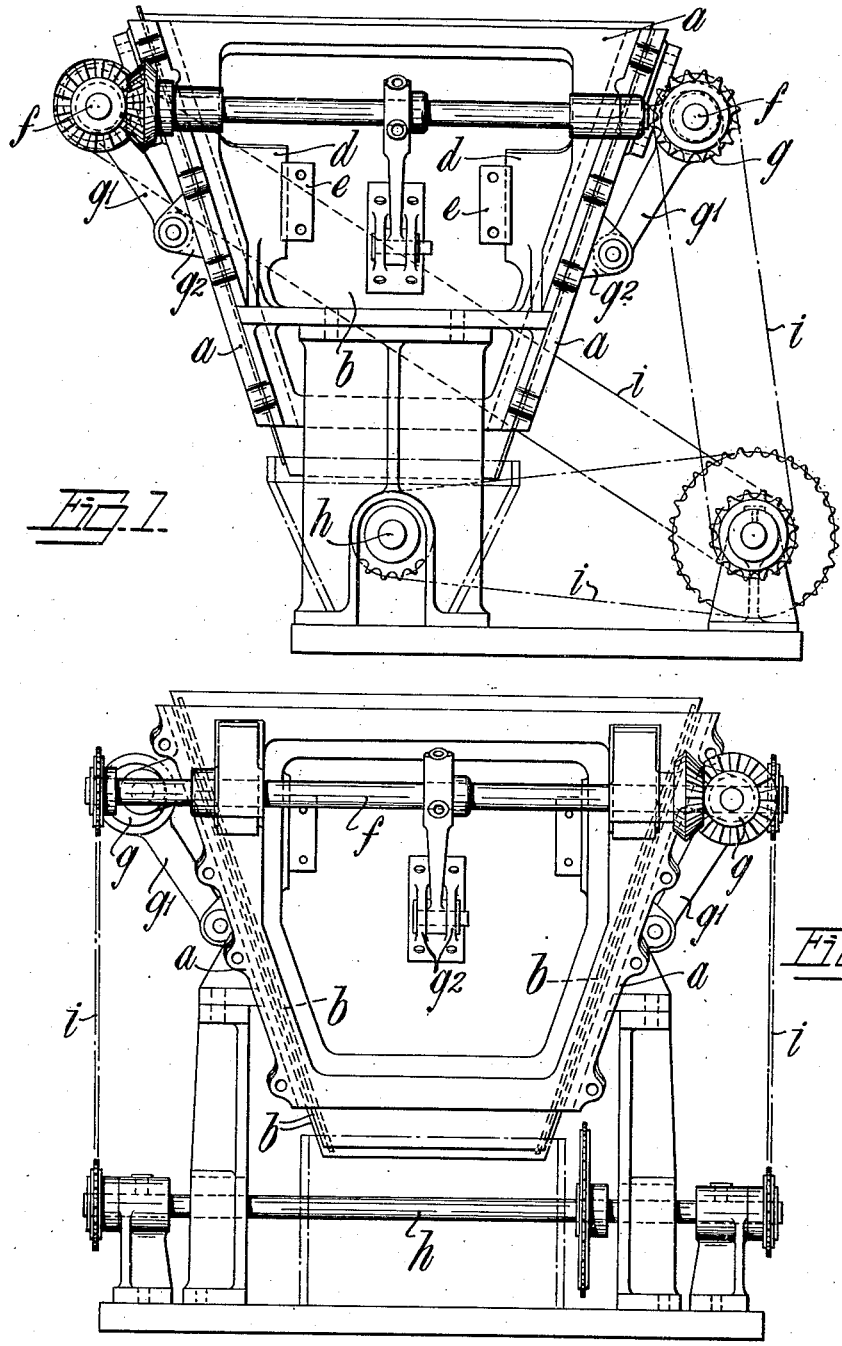

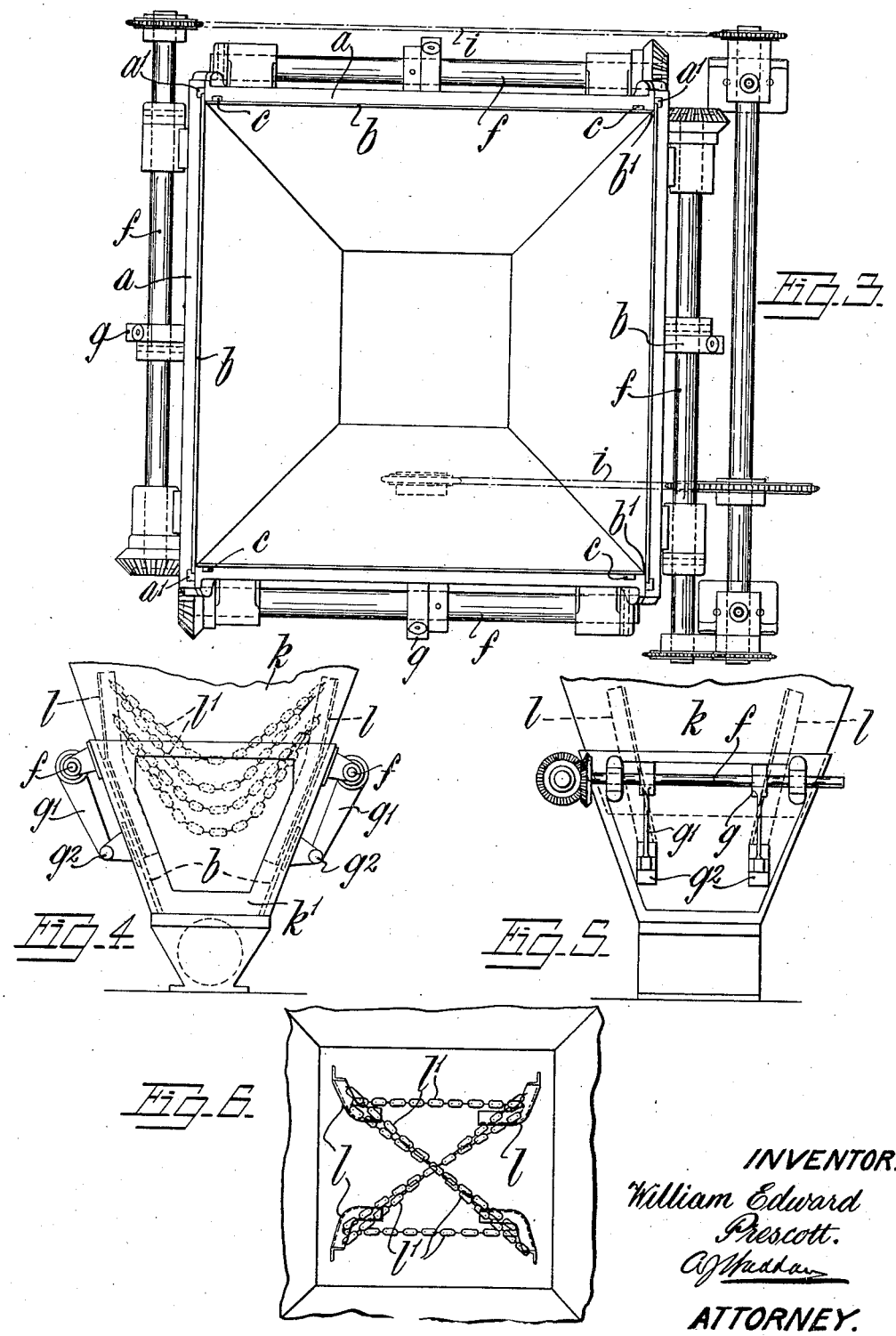

1,548,385

UNITED STATES PATENT OFFICE.

WILLIAM EDWARD PRESCOTT, OF LONDON, ENGLAND, ASSIGNOR TO BAKER-PERKINS COMPANY, INCORPORATED, OF WHITE PLAINS, NEW YORK, A CORPORATION OF NEW YORK.

FEED HOPPER.

Application filed December 12, 1923. Serial No. 680,179.

*To all whom it may concern:*

Be it known that I, WILLIAM EDWARD PRESCOTT, residing at London, N. W., England, a subject of the King of Great Britain and Ireland, have invented certain new and useful Improvements in or Relating to Feed Hoppers, of which the following is a specification.

This invention relates to hoppers for feeding various materials such as semi-liquid, plastic, powdered or granulated substances to different machines or mechanisms, such as mixing machines, and the object is to provide such hoppers with improved means for agitating or keeping in movement the contents in order to facilitate the discharge or feed of said contents.

Broadly stated, the invention consists in forming the sides of the hopper of a skeleton framework, the walls being completed by plates or slides adapted as to any or all of them to be reciprocated in succession or any desired sequence in order to keep the contents in continuous movement.

The invention also comprises details of construction, arrangement and combinations of parts as hereinafter fully described and specifically pointed out in appended claims.

Embodiments of the invention are illustrated in the accompanying drawings in which Fig. 1 is a side elevation, Fig. 2 is an end elevation, and Fig. 3 a plan of one embodiment, whilst Figs. 4 to 6 are similar views of another embodiment on a reduced scale.

In the example shown in the drawings a tapered hopper of rectangular form in plan is shown, the hopper structure itself being made of skeleton form, that is to say, it consists of an exterior framework $a$, the walls being completed by vertically movable or reciprocating plates or slides $b$ which are guided in said frame in such a manner as to make substantially tight joints at the corners or meeting edges of the plates. For this purpose the frame $a$ may be grooved as at $a^1$ adjacent the joints, to receive the butt or squared ends of one plate $b$, the adjacent plate being bevelled as at $b^1$ with its point or edge abutting against the first plate close to the end in the said groove $a^1$. As an alternative, the edges of the plates may be bevelled with the bevels fitting substantially close together. Again, behind the plates the frames may be channeled as at $c$ so that should any leakage of the contents take place between the joints of said plates it will flow down the channels into the lower part of the hopper. The framework is also provided with rectilinear or vertical extensions or brackets $d$ adapted to guide the slides $b$ in their movement as by means of plates $e$ on said slides engaging the extensions or brackets.

The slides or plates are mechanically reciprocated in succession or other desired sequence in order to keep the contents in continuous movement or feed and for this purpose the preferred arrangement is to provide at each outer side of the hopper near the upper part thereof a rotary shaft $f$ carrying an eccentric or crank $g$ the sheave or rod $g^1$ of which is connected to the back or outer face of a slide as by lugs $g^2$.

The said shafts may be driven from a single source of power, for example a shaft $h$, by belts or chains $i$ either collectively or in pairs, the latter being shown in Fig. 3, all of said shafts $f$ or said pairs of shafts being interconnected for such drive as by means of bevel gears $j$.

The size of the plates or slides and the length of their reciprocating stroke are such that at all times the full capacity or area of the hopper structure is available for use.

It will be obvious that the slide $b$ at one, two or more sides only of the hopper may be reciprocated if desired and that the hopper may be made of any desired section or other shape, for example the sides thereof need not taper but may be vertical, in which case the tendency to leakage past the joints is minimized.

In the case of hoppers of large dimensions, the same may be formed in two parts $k$ $k^1$ such as shown in Figs. 4 to 6, one part, for example the upper one $k$, having plain or solid walls, and the other part $k^1$ formed as above described with the reciprocating plates or slides $b$ to which however there are attached as by brackets $l$ a convenient number of blades, arms or other elements shown in the drawings, as interiorly suspended chains $l^1$ extending upwards into said solid part and which as the plates are reciprocated will agitate the contents and prevent "bridging" of the contents, that is to say, a form taken by the material when the hopper is in operation in which a quantity of said material may form a bridge from one side of the hopper to the other. This is prevented by said chains $l$ so that in the movement of the slides $b$ the chains prevent any tendency of the material to form a "bridge."

What I claim as my invention and desire to secure by Letters Patent of the United States is:—

1. A feed hopper comprising a skeleton framework, reciprocable plates mounted in the skeleton framework and forming the side walls of the hopper, and means for reciprocating said plates.

2. A hopper for feeding materials and comprising a skeleton frame, guides associated with said skeleton frame, and reciprocable plates mounted in said guides and forming the side walls of the hopper.

3. In a hopper for feeding materials, reciprocable side walls for facilitating the feeding of materials through the hopper, and agitating means carried by the reciprocable side walls, and operated thereby.

4. In a hopper for feeding materials, reciprocable side walls for facilitating the feeding of materials through the hopper, means for reciprocating the side walls, and agitating means carried by said side walls and bridging the hopper.

5. In a hopper, reciprocable side walls, means for reciprocating said side walls to facilitate feeding of materials through the hopper, and flexible agitating elements bridging said hopper and attached to the side walls thereof.

6. In a hopper, reciprocable side walls, means for reciprocating said side walls, and movable agitating elements bridging the hopper and operated by the movement of said reciprocable side walls.

7. In a hopper, reciprocable plates forming the side walls of the hopper, means for reciprocating said plates, and flexible agitating elements bridging the hopper and suspended from said reciprocable plates.

8. A hopper for feeding materials, said hopper comprising a skeleton frame, guides associated with said frame, reciprocable plates mounted in said guides and forming the side walls of the hopper, means for reciprocating said plates, and a plurality of grooves formed in the skeleton frame in a position behind the plates and adjacent the joints thereof, whereby leakage through the joints will be conveyed to the discharge of the hopper.

In witness whereof I have signed this specification.

WILLIAM EDWARD PRESCOTT.